United States Patent
Leicht, Sr.

(10) Patent No.: US 8,240,421 B2
(45) Date of Patent: Aug. 14, 2012

(54) ADAPTER FOR A CORVETTE REAR DIFFERENTIAL

(75) Inventor: Raymond Lewis Leicht, Sr., Levittown, PA (US)

(73) Assignee: Chassis Concept, Inc., Levittown, PA (US)

( * ) Notice: Subject to any disclaimer, the term of this patent is extended or adjusted under 35 U.S.C. 154(b) by 366 days.

(21) Appl. No.: 12/885,955

(22) Filed: Sep. 20, 2010

(65) Prior Publication Data

US 2012/0067663 A1 Mar. 22, 2012

(51) Int. Cl.
*B60K 17/00* (2006.01)

(52) U.S. Cl. ........ 180/352; 180/354; 180/360; 180/375; 180/376; 180/378

(58) Field of Classification Search .......... 180/346, 180/352, 354, 360, 375, 376, 377, 378
See application file for complete search history.

(56) References Cited

U.S. PATENT DOCUMENTS

| | | | | |
|---|---|---|---|---|
| 4,671,370 | A * | 6/1987 | Krude | 180/348 |
| 4,771,842 | A * | 9/1988 | Mishio et al. | 180/376 |
| 5,012,885 | A * | 5/1991 | Hilden | 180/254 |
| 5,402,859 | A * | 4/1995 | Boberg et al. | 180/360 |
| 6,193,007 | B1 * | 2/2001 | Lie | 180/374 |
| 6,209,676 | B1 * | 4/2001 | Jones et al. | 180/354 |
| 6,345,680 | B1 * | 2/2002 | Hill | 180/376 |
| 6,412,589 | B1 * | 7/2002 | Barlage et al. | 180/377 |
| 6,523,844 | B2 * | 2/2003 | Panizzolo | 280/124.111 |
| 6,578,657 | B2 * | 6/2003 | Baxter, Jr. | 180/376 |
| 6,758,302 | B2 * | 7/2004 | Penzotti | 180/383 |
| 6,782,965 | B2 * | 8/2004 | Sztykiel et al. | 180/292 |
| 7,617,892 | B2 * | 11/2009 | Nishimoto et al. | 180/53.4 |

OTHER PUBLICATIONS

KevinStang.com/ninecase.
dennysdriveshaft.com/ford 9 inch pinon yoke.
dennysdriveshaft.com/ford 9 inch pinon bearing.
photograph.
Moser Engineering 9 inch complete built.
Moser Engineering 9 inch ford Daytona pinon support.

* cited by examiner

*Primary Examiner* — Toan C To
(74) *Attorney, Agent, or Firm* — Paul & Paul

(57) ABSTRACT

An adaptor for an older Corvette drive train provides a structure for coupling the drive shaft extending from a front-mounted transmission to the differential of a C5 or C6 Corvette rear suspension in which the rear mounted transmission has been removed. A housing holds a stub shaft for rotation on front (outside) and rear (inside) bearings. The shaft has a coupling yoke mounted to its front end and engages the differential gearing at its other (rear) end. The housing mounts to the differential at the five mounting points of the removed transmission. A bracket which attaches to frame mounts can be mounted to either the top or bottom front (outside) face of the housing, depending upon the suspension-to-frame geometry. A circular flange on the shaft positions and holds the inside bearing and a rearward extending boss on the yoke positions and holds the outside bearing. A crushable tubular spacer fits over a portion of the shaft and holds the front and rear bearings apart during assembly and while the shaft assembly is drawn up. Two grease ports and fittings access the interior of the peripheral sealing ring to meet and seal the differential opening.

20 Claims, 9 Drawing Sheets

ADAPTER FOR A CORVETTE REAR DIFFERENTIAL

FIELD OF THE INVENTION

This invention is related to automotive drive train adaptors, specifically an adaptor which permits the mating of drive train components not normally designed to be connected.

BACKGROUND OF THE INVENTION

The present invention is directed to an adaptor which permits a Chevrolet Corvette C5 or C6 rear end assembly to be used in a rebuild of an older Corvette, such as a C1, C2, or C3 generation model.

The Corvette has had six generations of vehicle design, typically known in the industry as C1 through C6, with the C1 being produced from 1953 to 1962, the C2 being produced from 1963 to 1967, the C3 being produced from 1968 to 1982, the C4 being produced from 1984 to 1996, the C5 being produced from 1997 to 2004, and the C6 being produced from 2005 to date.

Each generation has maintained a fundamental design in its body, suspension, drive train, and engines, with changes being introduced from model year to model year within a generation to meet pollution requirements and changes in gasoline chemistry, to introduce appearance features, or to change engine and transmission specifications for sales promotion purposes.

Through the years, the Corvette has become an American icon in the automotive industry. Attractive styling, sports car performance, and the use of fiberglass and plastic materials and exotic metals have attributed to a long standing desirability for older Corvette models among the public.

An industry now exits in which older Corvettes are rebuilt or remanufactured from the ground up, i.e., from the frame outward. These rebuilt Corvettes often sell privately or at auction for in excess of $150,000 depending upon the model. The rebuilding of an older Corvette becomes the building of a Corvette as new parts from frame to suspension, to brakes, to engine, to drive train are introduced. Of necessity, the body remains, in whole or in part, from the original factory production.

Through the various generations, changes have occurred in engines, drive trains, transmissions and suspensions. The C1 Corvette began with an inline six-cylinder engine, a two-speed automatic transmission, drum brakes and a solid rear axle with longitudinal leaf springs. A "small-block" (1955-1956) V8 engine and constant flow fuel injection was later introduced for the C1 Corvette for 1957-1961 in a 283 cu. in. engine.

The C2 Corvette started with independent rear suspension, and a larger small-block (327 cu in) V8 engine with optional electronic ignition. As the C2 model years progressed with even higher horsepower with the larger (327 cu. in.) V8 engines and introduced two big-block (396 cu in and 427 cu in) V8 engines with modified automatic and manual transmissions and changes in carburation. These C2 big-block Corvettes are one of the most desirable antique vehicles in the United States.

The C4 Corvette introduced a light-weight composite, transversely mounted, monoleaf front suspension that has been the standard for Corvettes ever since. A larger big-block (454 cu in) V8 engine with redesigned transmission was also introduced. The rear suspension remained with independent pivoting axels, leaf spring suspension similar to the design of the C2 Corvette. However, in later model years a cross-fire, throttle body injection engine was introduced, as well as plastic composite rear coil springs, thinner body panels, a catalytic converter, and an aluminum differential. More of the changes in model years addressed engine changes, engine modifications and transmission changes than changes in other portions of the vehicle.

As with earlier generations, the C4 Corvette introduced a change in body style and looks. It also introduced changes in engines, carburetion/fuel injection and transmissions, as well as a transverse composite leaf spring in the rear.

The C5 Corvette introduced major changes over the previous generations. Instead of a beam/rail type perimeter frame onto which the body was bolted, the C5 had a hydroformed perimeter frame integral with the body. The front and rear suspension assemblies which hold the engine, transmission, differential and suspension structure were joined by a center torque tube. The front suspension included alloy upper and lower control arms and steering knuckle, transverse monoleaf plastic composite spring, steel stabilizer bar, spindle offset and gas-pressurized shock absorbers positioned to operate within the cavities of the front wheels. The rear suspension was an independent 5-link design with toe-in and camber adjustment, alloy upper and lower control arms and knuckle, transverse monoleaf plastic composite spring, steel stabilizer bar and tie rods, tubular u-joint metal matrix composite drive shafts, and gas-pressurized shocks positioned to operate within the cavities of the rear wheels. The new geometry of the C5 rear suspension, including the new transverse leaf spring, offered greatly improved handling and lateral stability as well as providing an improved ride which reduced body rattles and squeaks.

The rear suspension short-long arm and transverse leaf spring independent suspension configuration of the C5 was carried over into the C6 Corvette. However, the geometry of the cradles, control arms, knuckles, dampers and stabilizer bars was redesigned. These changes, including adjustments in various dimensions, have produced ever-improved ride and handing, less road noise, and better body control under greater lateral acceleration.

Both the C5 and the C6 Corvette rear suspensions have height adjustments for raising or lowering the vehicle. It is well accepted in the marketplace that the C5 and C6 rear suspension designs are great improvements over the previous generations of Corvettes. Like the C4, the C5 and C6 suspensions continued with the leaf spring configuration, where the link arms permit the shock structure to extend into the interior space of the wheels.

Like the C5 Corvette, the present C6 Corvette has its transmission mounted to the rear differential. This feature was introduced in an effort to obtain a 50-50 weight distribution in the vehicles. However, for body clearance when adapting a C5 or C6 rear suspension to an older C1 through C3 Corvette, the transmission must be mounted to the engine.

While more and more Corvette enthusiasts are requesting C5 or C6 rear suspensions in their rebuilt older generation vehicles because of the better handling and ride, such crossover use is not possible without modification to the drive train and body.

Older Corvettes can have one-piece drive shafts connecting the transmission to the rear differential, with the transmission being mounted at the engine. In order to use a C5 or C6 rear suspension on the older Corvettes it is necessary to eliminate the rear mounted transmission and provide an adaptor between the drive shaft and the differential.

An object of the present invention is to provide an adaptor which mounts to an existing C5/C6 differential with the same sealing function as the C5/C6 transmission housing.

A second object is to provide an adaptor which will handle the power from a modern "crate" engine, an original specification engine and transmission when coupled to the end of the drive shaft.

A third is to provide an adaptor with a structure for more than one mounting configuration to accommodate different suspension height adjustments.

Another object is to provide an adaptor with a structure for coupling to the end of the drive shaft from a front-mounted transmission.

A further object is to provide an adaptor with sufficient lubrication to promote longevity of operation and reduce heat build-up.

SUMMARY OF THE INVENTION

The objects of the present invention are realized in an adaptor which mounts to the rear differential of a C5 and C6 generation Corvette suspension assembly in place of the factory transmission housing normally attached to the differential, which has been removed. The adaptor includes a housing machined from a solid alloy block, with a front (outside) and rear (inside) faces. The inside face of the adaptor housing includes a toroidal-shaped flange which carries a peripherally mounted sealing ring, with the flange and sealing ring operating to seal the opening in the differential created upon the removal of the O.E.M. transmission housing. The outside (front) face of the adaptor housing has an outwardly projecting boss. A cylindrical cavity (bore) extends longitudinally through the housing.

The housing supports a stub shaft which couples the end of the drive shaft from a front mounted engine/transmission to the rear differential. The shaft support within the housing includes a pair of bearings, a larger rear (inside) bearing and a smaller front (outside) bearing being positioned from about ½ inches to about 2 inches apart depending upon the housing geometry. In the preferred embodiment, the bearing races of the inside and outside bearings are spaced about ½ inches apart.

The housing has a cylindrical cavity (bore) which forms a central tubular-like portion shaped as the result of the boring through the alloy block. This tubular-like portion holds the bearings that in turn support the shaft which passes through it. Surrounding, and laterally extending outwardly from the central tubular-like portion of the housing are projecting ears having through holes for mounting studs and also a build-out wall carrying threaded holes for receiving bolts. These structures are used to mount the housing to the differential with the same mounting components used for mounting the removed O.E.M. transmission.

A front boss, which extends forward from the front (outside) face of the housing block, receives the outside (front) bearing race and its bearing and permits the overall weight of the housing structure to be reduced by permitting a reduction in the thickness of the projecting ears and the thickness of the wall build-out mounting structures. In addition, the boss has a thinner wall than the body of the housing, which permits more heat to dissipate from the front (outside) bearing region, thereby permitting the use of a smaller front bearing, than with the rear bearing which is positioned within the main body of the housing.

The rear bearing race and its rear bearing are inserted into the rear portion of the bore which is concentric with the center of the toroidal-shaped flange.

The bore has two internal annular shoulders with different through bore diameters which are stepped from one to the other, with the inner (rear) shoulder having the smaller (bore diameter) opening and the outer (front) shoulder having the larger (bore diameter) opening. The inner shoulder operates as the abutment stop for both the front and rear bearing races. The longitudinal thickness of this shoulder establishes the spacing between the outside and inside bearings.

The portion of the bore leading from the rear (inside) face of the housing to the inner (rear) shoulder is a neat (tight) fit for the circumference of the rear (inside) bearing race. Similarly, the inside bore diameter of the outer (front) shoulder is a tight fit for the circumference of the outside (front) bearing race. The bore portion leading from the front (outside) face of the housing to the outer (front) shoulder is about the same size in bore diameter as that leading from the rear (inside) face to the rear (inside) shoulder. This outside (front) bore portion has an annular oil grove in its inside wall positioned away from the front (outside) shoulder.

A pair of grease ports lead from two separate side faces of the housing to the inside face of the rear (inside) annular shoulder. Each grease port is tapped and threaded to receive a fitting. The first port is positioned on a side face of the housing significantly lower than the second port, which is positioned on the top side face of the housing. The lower first port is fitted with a snap-fit grease fitting for feeding grease to the interior of the housing at the inside (rear) annular shoulder. The upper second port is fitted with a pressure relief/bleeder fitting.

As the bearings are open bearings, grease forced into the housing will first fill the bearings and then fill the bore about the shaft in both the front (outside) and rear (inside) bore portions. These grease pockets provide additional sources of lubrication for the bearings. A rear (inside) grease/oil seal having an internally mounted double layer wiper seal is mounted at the back (inside) bore portion housing wall.

A front (outside) grease/oil seal is mounted at the front (outside) bore portion housing wall. A coupling yoke mounted to the front of the shaft carries a dust cover for the front (outside) grease/oil seal.

The shaft has a spline section at both of its ends. The rear (inside) spline mates with a gear in the differential. The front (outside) spline is used to mount the coupling yoke.

Inboard from the front (outside end) shaft spline is a section of the shaft which is machined to receive the rear (inside) bearing and then the front (outside) bearing, both in press-fit fashion. This machined section terminates at a peripherally/outwardly extending circular flange machined with a flat face adjacent the machined shaft surface and with a fillet on the opposite side.

The shaft has a threaded end outboard of its yoke-mounting spline section. This treaded end receives a nut which tightens against the hub of the yoke to draw the assembly together.

The yoke has a Y-shaped coupling end of cast material. A central longitudinal bore has been cut though the hub of the coupling with an internal spline. The side opposite the Y-shaped coupling has a projecting boss or cylindrical projection for abutting the back of the front (outside) bearing. The opposite end of the hub has a machined face against which a tightening nut operates when engaging the threads at the shaft end.

The outer (front face) of the housing has a series of threaded holes above and below the housing boss. These holes are for mounting a bracket, which can be mounted above or below the housing boss, depending upon the geometry of the assembly. The bracket has a pair of tabs or ears for mounting it to a pair of frame mounts.

The adaptor is assembled by first pressing the front (outside) and rear (inside) bearing races into the bore to abut the inner (rear) annular shoulder, which has the grease openings on its inside face. The rear (inside) bearing is pressed over the machined section of the shaft to abut the machined face of the flange.

The shaft is extended through the housing, and the front bearing is started onto the machined section of the shaft. A crushable separator may be used to separate the bushings until the shaft assembly is tightened. The front seal is tapped into place at the front bore opening. Then the coupling's spline section is started onto the mating spline section on the shaft. The nut is then started on the threaded end of the shaft. Tightening the nut forces the two bearings into the housing bores. When the bearings are sufficiently "set", i.e., the assembly is sufficiently tight. Then the rear (inside) grease seal is assembled over the outside edge of the flange and the rear (inside) dust cover is tapped tight against the rear (inside) bore opening. The housing is then greased to completely fill all spaces with grease. Then bearing play is checked and the nut is finally tightened to set the bearing tightness for operation.

The housing is mounted to the differential at the five mounting points of the removed O.E.M. transmission.

BRIEF DESCRIPTION OF THE DRAWINGS

The features, advantages and operation of the present invention will become readily apparent and further understood from a reading of the following detailed description with the accompanying drawings, in which like numerals refer to like elements, and in which.

DETAILED DESCRIPTION OF THE INVENTION

Figure 1:
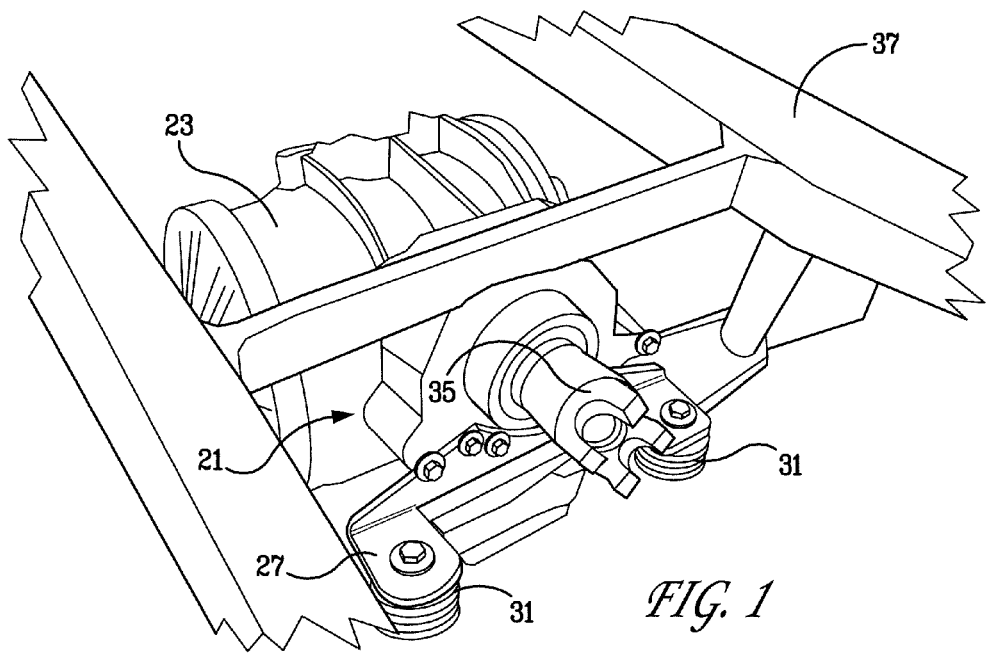
FIG. 1 is a partial perspective view of the adaptor of the present invention mounted to the rear differential of a C5 generation rear suspension which is mounted to the frame of an earlier generation Corvette.

The present invention is an adaptor 21, FIG. 1, for mating the front mounted engine and transmission of an older generation Corvette to a newer generation, specifically a C5 or C6 rear differential and suspension. The adaptor 21, FIG. 1, bolts to the front of a C5 or C6 differential 23 in place of the removed O.E.M. transmission. The adaptor 21 includes a housing 25, FIGS. 1-2. A bracket 27 is bolted to the front face 29 of the housing 25. This bracket 27 also bolts to frame mounts 31. This bracket 27 can be bolted below a shaft 33 (not shown in FIG. 1) and coupling yoke 35 as shown in FIG. 1, or above them, depending upon the geometry of the vehicle frame 37 and the mounting configuration of the rear suspension assembly of which the differential 23 is a part.

The adaptor 21 assembly, FIGS. 2-8, and in particular, the housing 25 carries a pair of threaded holes 39 (not shown in FIG. 2) near the top of its rear/inside face 41 and another near the bottom (not shown in FIG. 2) for mounting the housing 25 with the differential 23, with mounting bolts 43. Internal to the housing 25 is a stub shaft 33 (not shown in FIGS. 1-3). In addition, mounted on the front/outside end of the stub shaft 33 is the coupling yoke 35 to which the vehicle drive shaft 45 is connected, FIG. 2. The housing 25 is machined from a block of alloy material.

Figure 3:
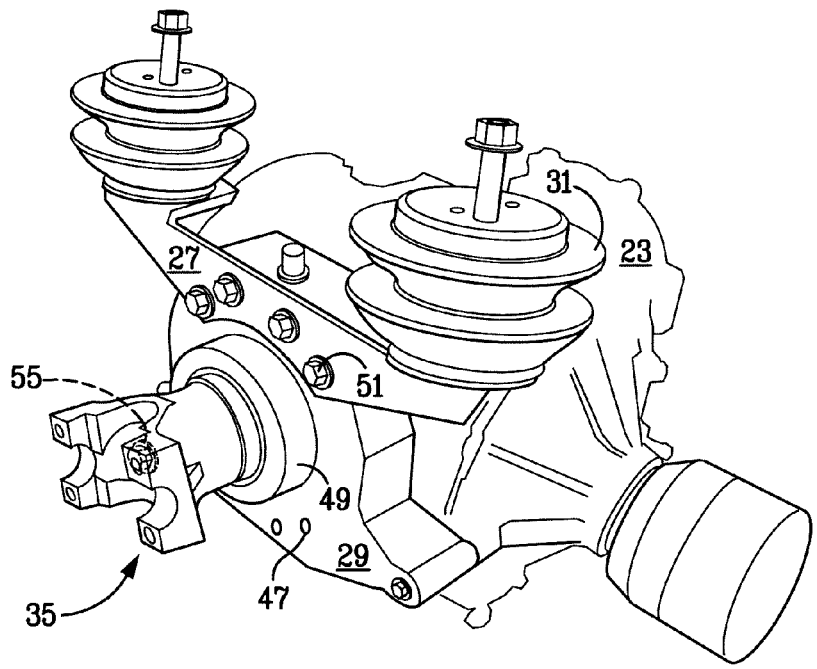
FIG. 3 is a perspective view of the adaptor mounted to the rear differential with the mounting bracket above the shaft for holding mounting bushings.
Figure 4:
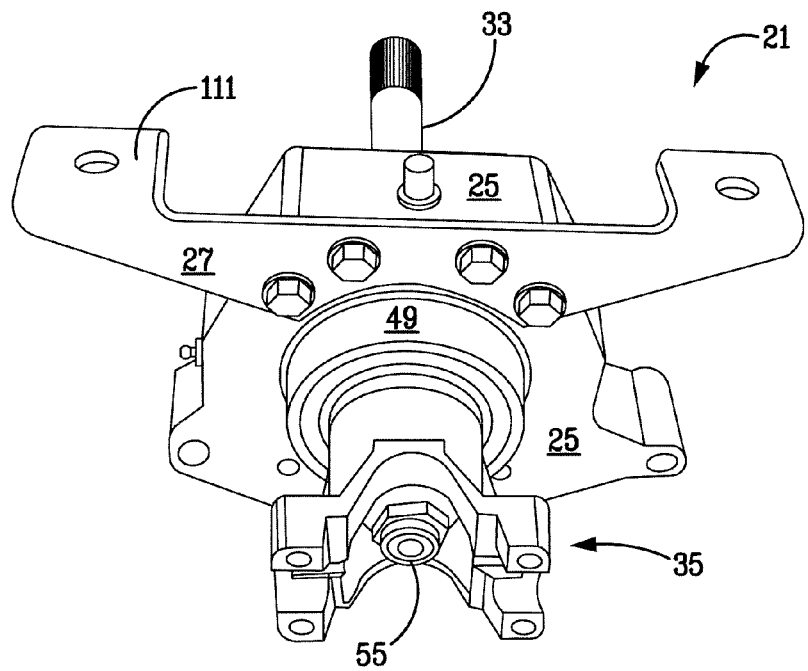
FIG. 4 is a front perspective view of the assembled adaptor for the set up of FIG. 3 before being mounted.

The housing 25, FIGS. 3-4, has a series of four threaded holes 47 near the top of its outer face 29 extending in an arc above a front boss 49, which boss projects forward from the outer/front face 29 of the housing 25. A second series of similar sized and spaced threaded holes 47 are below the front boss 49 in a similar arc.

The threaded holes 47 are used to mount a bracket 27 to the front/outer face 29 of the housing 25, either above or below the boss 49 with fastening bolts 51. The bracket 27 connects to frame mounts 31 above the differential, FIG. 3, or below the differential, FIG. 5, depending upon the geometry of the frame-to-rear suspension setup. FIG. 4 shows the bracket 25 attached in the upper position, while in FIGS. 5-6 the bracket 25 is in the lower position.

Figure 5:
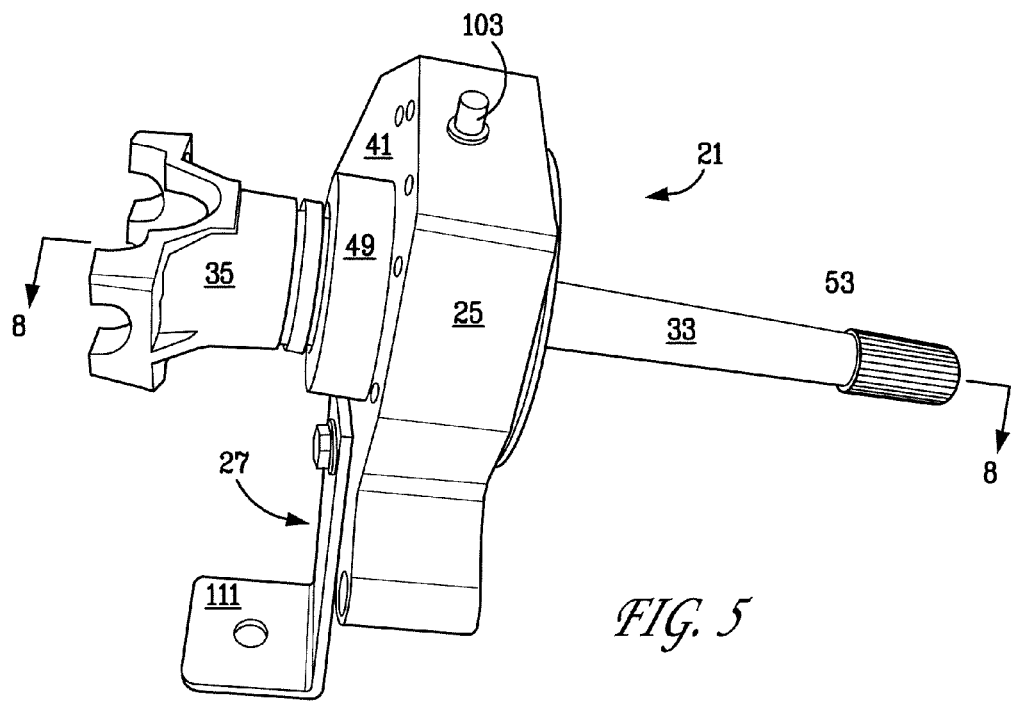
FIG. 5 is an opposite side perspective view of the assembled adaptor with a bracket.
Figure 6:
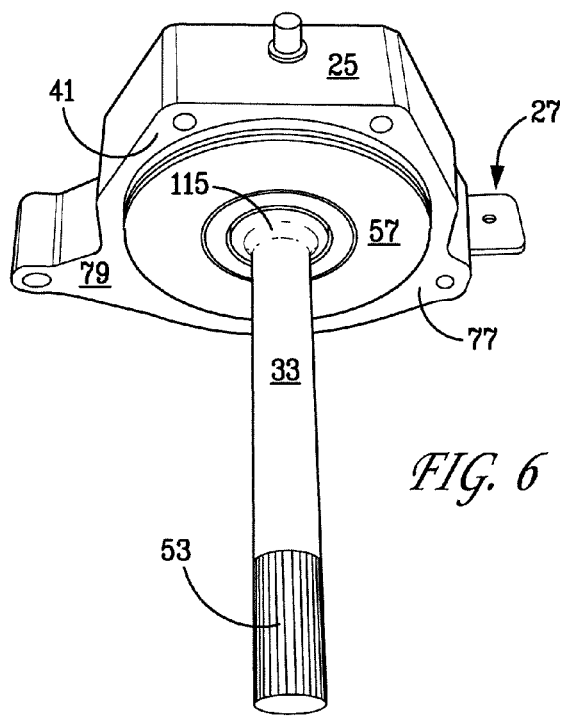
FIG. 6 is a rear perspective view of the assembled adaptor with a lower mounted bracket.

The assembled adaptor 21 as shown in FIGS. 4-6 has a stub shaft 33 which passes completely through the housing 25. The rear/inside end of the shaft 33 is splined with a rear spline 53 extending to the rear/inside end of the shaft 33. The opposite end of the shaft 33 has the coupling yoke 35 mounted thereto and held on with an end nut 55, FIG. 3. The rear/inside face 41 of the housing 25 carries a toroidal-shaped flange 57 through which the stub shaft 33 extends. This flange 57 and other housing features are discussed further below.

Figure 7:
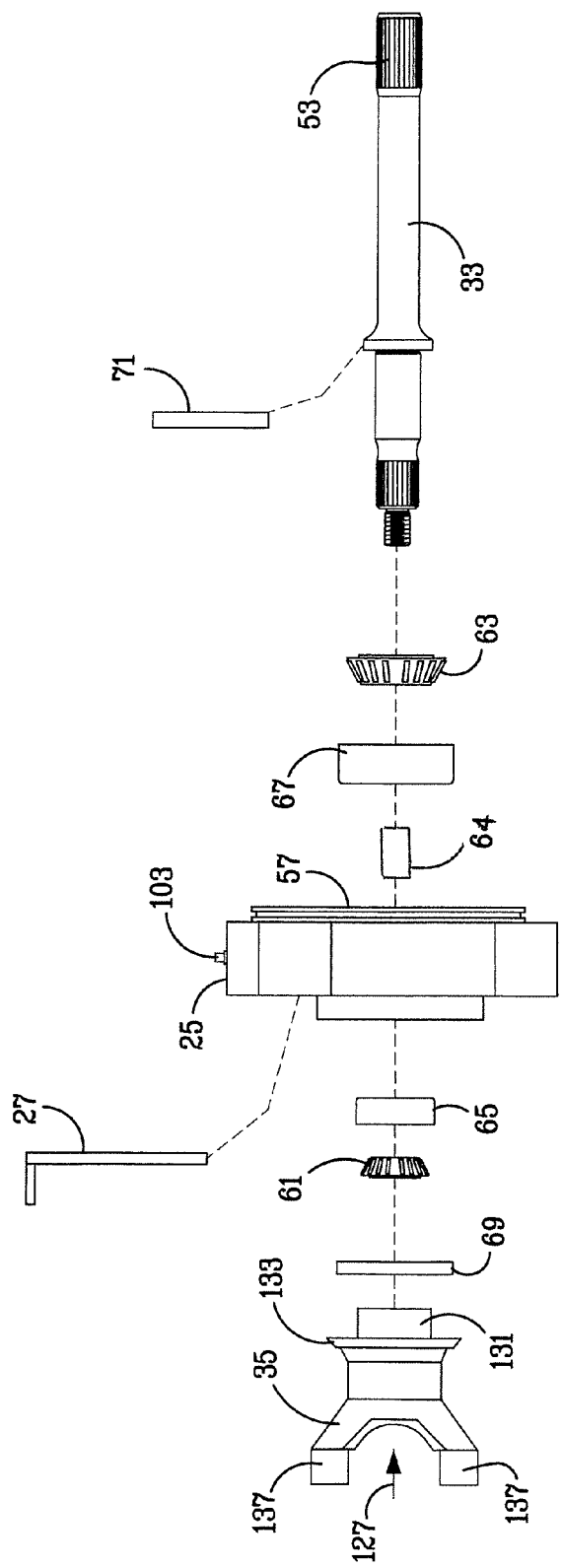
FIG. 7 is an exploded assembly view of the adaptor from a front perspective view.
Figure 8:
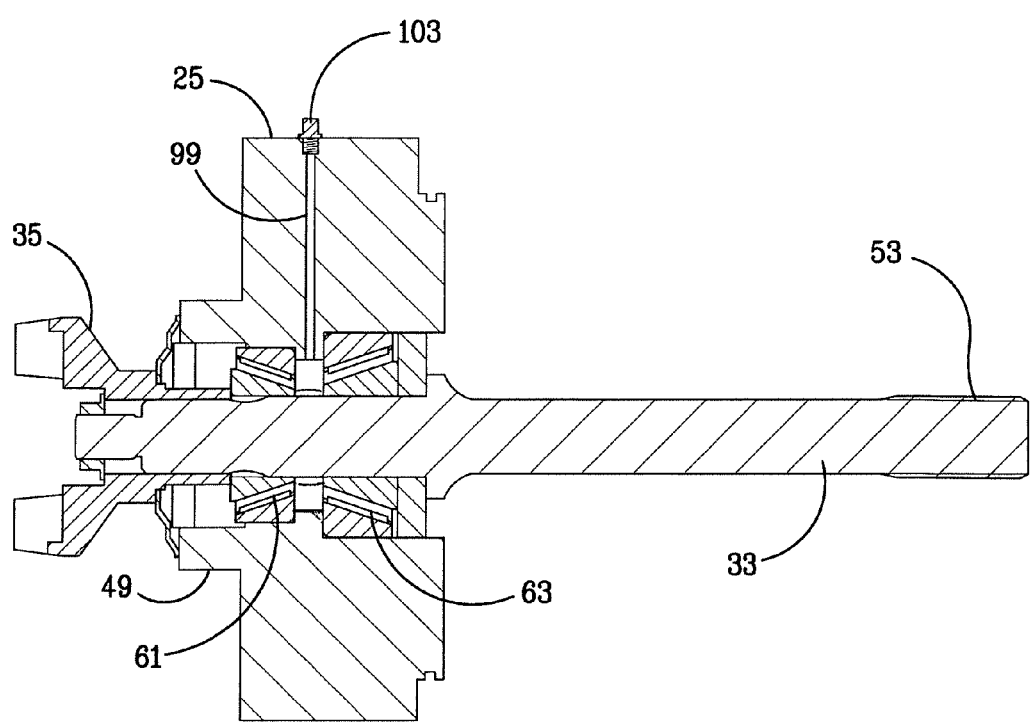
FIG. 8 is a side cross-sectional view of the adaptor taken as shown in FIG. 5.

FIG. 7 is an exploded assembly view of the adaptor 21 shown from a side view. FIG. 8 is a side cross-sectional view of the assembled adaptor 21 taken as shown in FIG. 5.

The housing 25 has a central bore 59 machined through it from its rear/inside face 41 to its front/outside face 29. The shaft 33 extends through the bore 59 and is supported by a front bearing 61 and a rear bearing 63. Each of these bearings is a thrust bearing with cylindrical rollers. There are mating front 65 and rear 67 bearing races, respectively. A front grease seal 69 and a rear grease seal 71, seal the respective ends of the shaft and bearings. A tubular spacer is positioned between the bearings 61, 63. This spacer is crushable when the assembly is tightened.

The housing through bore 59 includes a pair of interior annular flanges which will be discussed further below. The backs of the bearing races 65, 67 abut one of these flanges to establish the position of the bearings 61, 633 within the housing 25.

The bearings and bearing races are supplied by The Timken Company. The product numbers for these bearings 61, 63 and races 65, 67 are product numbers M88010, M88048 HM89444, and HM89410, respectively. The grease seals are supplied by SKF USA. The product numbers for these seals 69, 71 are CRW1R and HMSA25P, respectively.

The housing 25, itself, is shown in FIGS. 9*a*, 9*b*, 10*a*, 10*b* and 11, and has an irregular shape. Its overall outline is hexagonal with a smaller ear 77 on one bottom side and a larger ear 79 on the other bottom side. It is machined from high-strength aluminum alloy with a center bore 59 of about 2 inches in diameter in its smallest section. The size of the housing is about 3⅜ inches from the front face of the front boss 49 to the rear face of the toroidal flange 57. The overall height of the housing is about 6½ inches, and the overall width is about 9⅜ inches.

The toroidal flange 57 is about 6 inches in diameter with a 3-inch diameter bore opening 59 at its rear face. This flange 57 is about ⅜ inches thick, i.e., it extends about ⅜ inch outward from the rear face 41 of the housing 25. A ¹⁄₁₆ inch deep groove 73 extends about the peripheral wall of the flange 57 and holds an O-ring seal 75. When the housing is mounted onto the rear differential of the vehicle, the seal 75 seals the opening of the differential 23 to prevent grease from leaking out.

Figure 2:
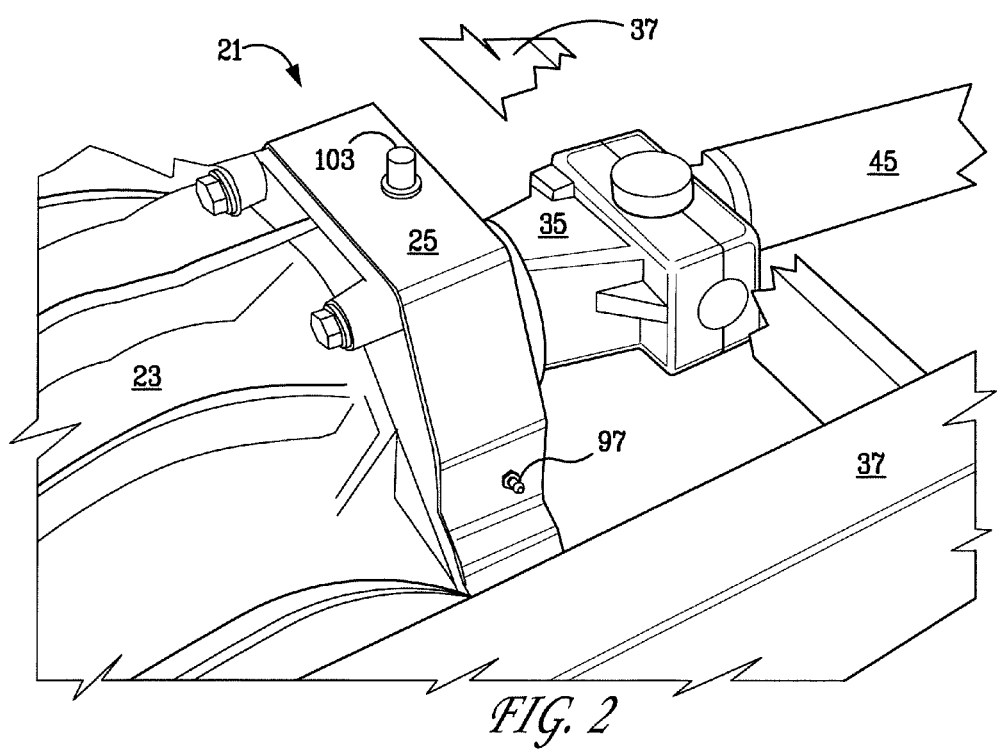
FIG. 2 is a second partial perspective view of the adaptor of FIG. 1 with the drive shaft connected to the coupling of the adaptor.
Figure 10A:
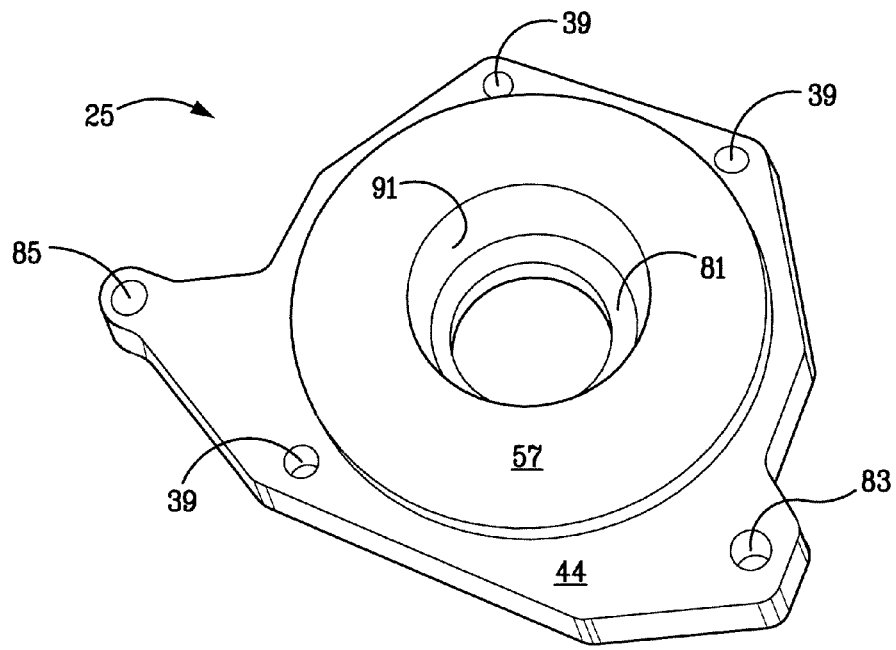
FIGS. 10*a* and 10*b* are rear and rear-perspective views of the housing, respectively.
Figure 10B:
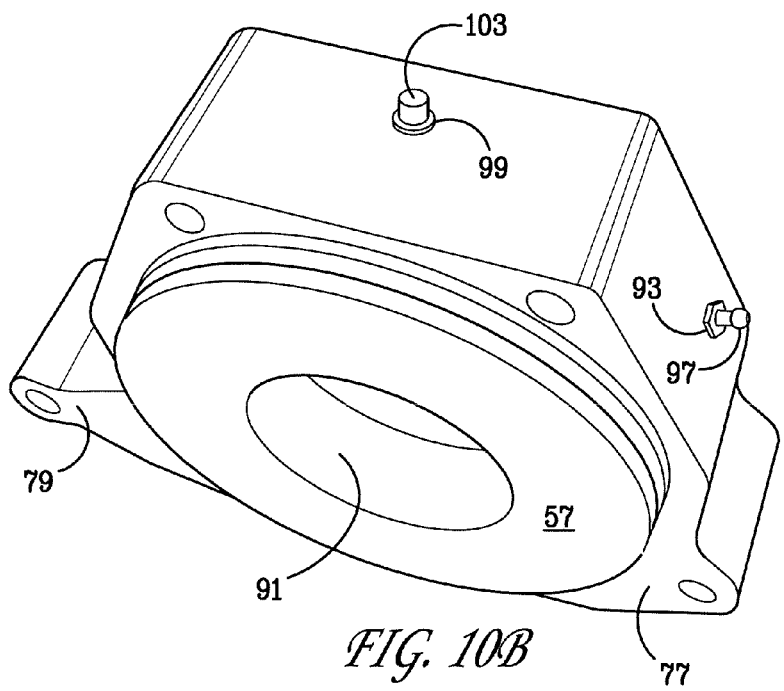
Figure 11:
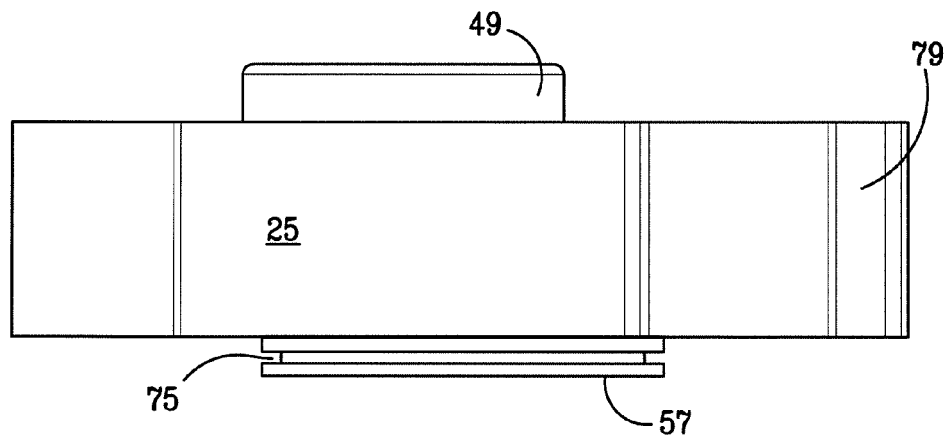
FIG. 11 is a bottom view of the housing with the rear seal ring installed on the periphery of the rear flange.

The threaded bolt holes 39, previously not shown on FIG. 2, are easily seen on the rear face 41 of the housing 25, FIG. 10a, and are each about ½ inch away from the edge of the toroidal flange 57. These holes 39 each receive ⁵⁄₁₆ inch fastening bolts 51 in the mounting positions for the vehicle's differential.

The 3-inch diameter bore 59 extends into the housing a distance of about 1½ inches to terminate in a first internal annular shoulder 81 having an inside (bore) diameter of about 2⅛ inches in diameter, FIG. 10a.

Each of the smaller and larger ears 77, 79 is shaped to provide a fastening point having a drilled hole 83, 85 therethrough. These holes are each ⅜ inches in diameter and have about a ⅝ inch deep, ⅝ inch diameter counter 87 sink on the front/outside housing face 29 side of each ear 77, 79.

The two sets of four threaded holes 47 for holding the bracket 27, are spaced in a circular arc of about 120 degrees, on a 3-inch bolt radius, with one set of holes 47 above and other set below the front boss 49, FIGS. 9a, 9b. Each of these bracket mounting holes is tapped to receive a ⅝ inch bolt. The arc center of these holes is about 1 inch away from the outside wall of the front boss 49.

Figure 9A:
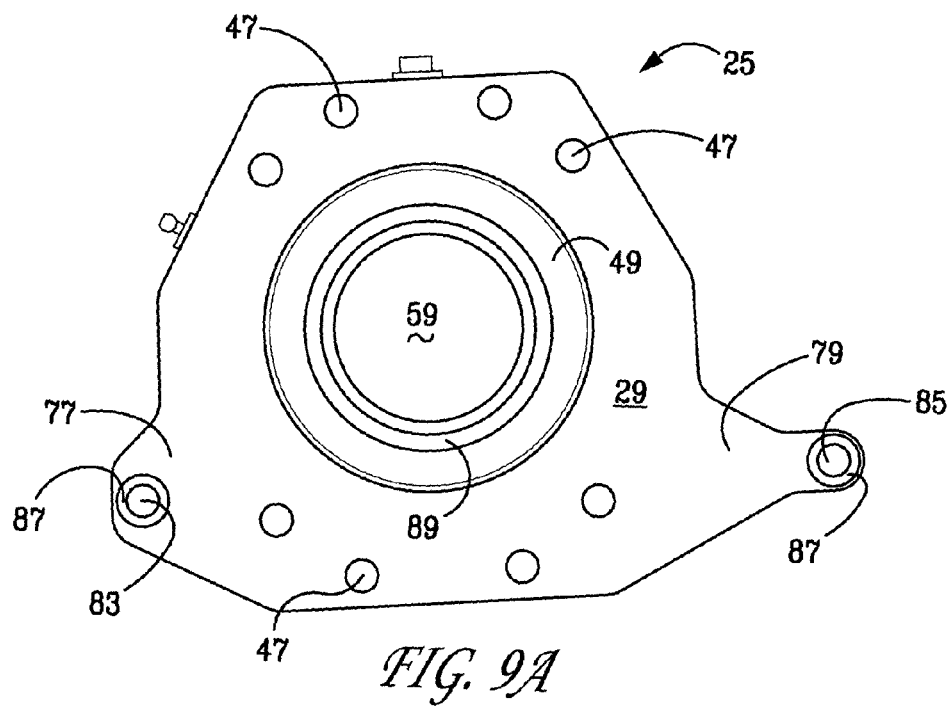
FIGS. 9*a* and 9*b* are front and front-perspective views of the housing portion of the adaptor, respectively.
Figure 9B:
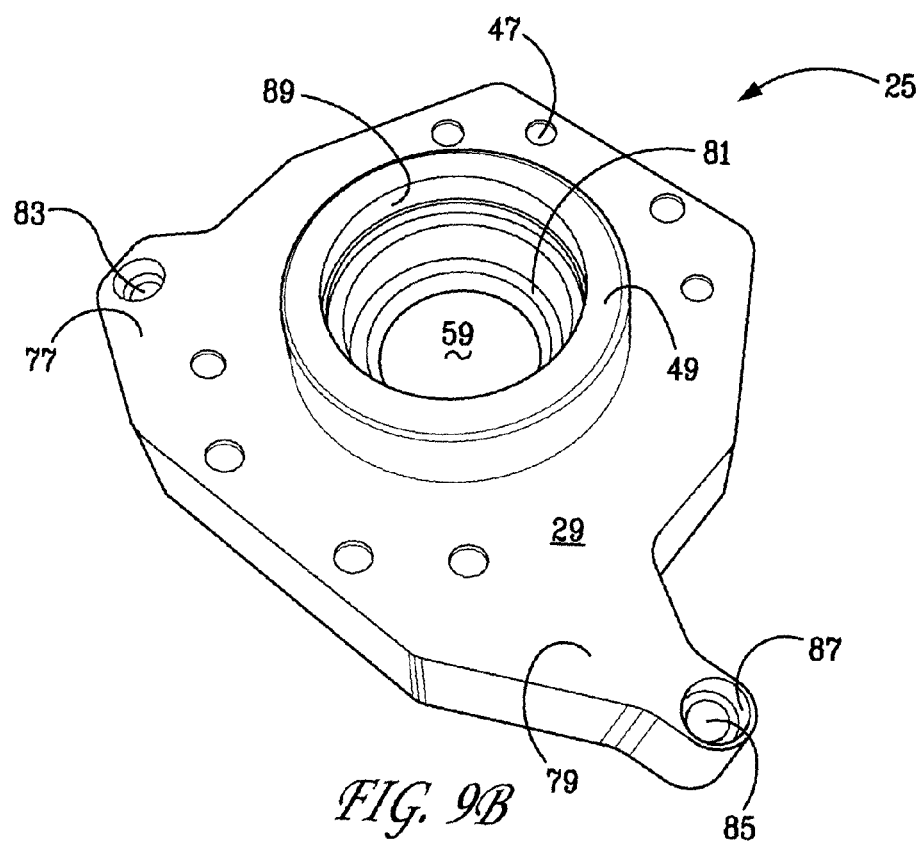

Front boss 49 has about a 4-inch outer diameter and a 3-inch inner diameter which extends inward about ¾ inches to terminate in a second internal annular shoulder 89, FIGS. 9a, 9b. This shoulder 89 is about ³⁄₁₆ inch high, i.e., it extends inwardly to establish its internal bore at about 2⅝ inches in diameter.

The second shoulder 89 is about ¾ inches deep (wide) and terminates against the first internal annular shoulder 81. The first internal shoulder 81 is about ½ inches wide and joins the second shoulder 89 to the 3-inch bore 91 extending from the outer face of the toroidal flange 57.

A first grease passageway 93 extends from a side face 95 of the housing 25 to the inside face of the first internal annular shoulder 81. This first grease passageway is fitted with a NPT Zerk-type grease fitting 97.

A second grease passageway 99 extends from the top face of the housing 25 to the inside face of the first internal annular shoulder 81. This second grease passageway is fitted with a plug 103 which can have a pressure-indicating, air-release, spring biased pin.

Figure 12:
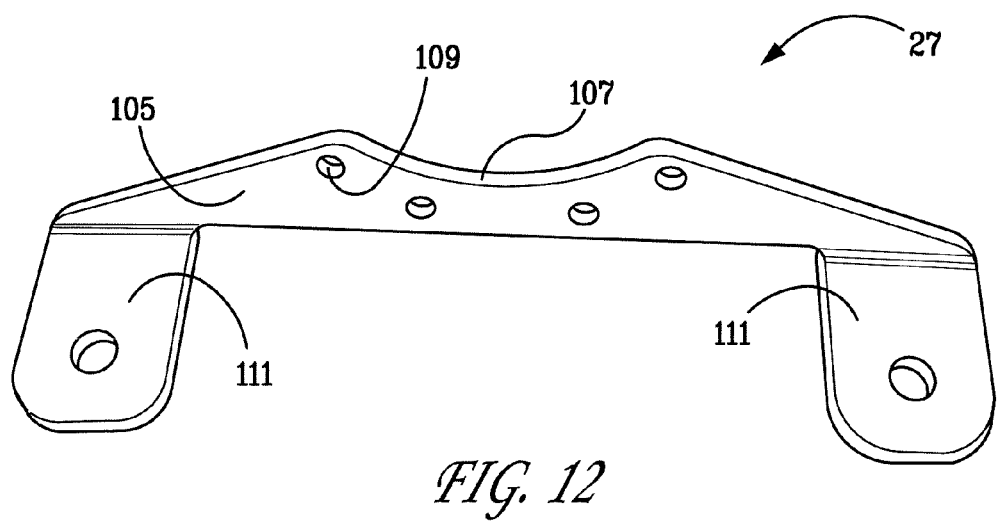
FIG. 12 is a front-perspective view of the bracket.

The bracket 27, FIG. 12, has a mounting wall 105 with an arc-shaped cutout section 107 to provide clearance for the front boss 49. Four holes 107 are drilled through the mounting wall 105 about the arc-shaped cutout to line up with either of the upper or lower four threaded holes 47 on the housing front/outside face 29. A pair of frame-mount receiving ears 111 extend perpendicularly outward from the mounting wall 105 at either end of the bracket 27. Each ear 111 has a ½ inch drilled hole for receiving and holding a frame mount 31. The bracket is about 12 inches long, with the ears each being about 2½ inches long by 2 inches wide. The bracket mounting wall 105 and the ears 111 are of ¼ inch thick, tempered, high carbon steel plate.

Figure 13:
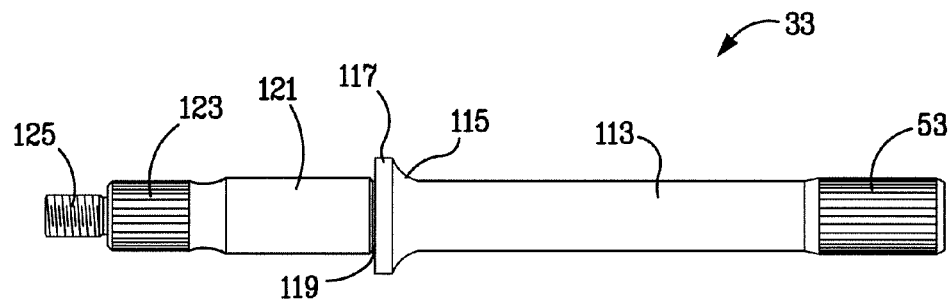
FIG. 13 is a side view of the stub shaft.

The shaft 33. FIG. 13 is about 15 inches long, end-to-end. The rear portion 113 of the shaft has been machined to have about a 1 inch outside diameter, and is about 8¾ inches in length from the rear of the spline 53 to a fillet 115 side of a circular flange 117. The rear spline portion 52 is about 2 inches long.

The circular flange 117 is about ¼ inch wide and 2 inches in diameter. The opposite side 119 of the circular flange 117 is machined flat to abut the rear bearing 63. Forward of the machined flat side 119 of the flange is a machined and polished section 121 of the shaft 33, which receives and holds both bearings 61, 63 and bearing races 65, 67. This polished section 121 is about 2⅜ inches long and has about a 1¼ inch outside diameter. Forward of the polished section 121 the shaft is necked down to about 1 inch in outside diameter leading to a front spline 123. This front spline section 123 is about 1⅜ inches long. Outboard/forward of the front spine 123 the shaft 33 is machined and threaded into a 1 inch long, ¹¹⁄₁₆ inch diameter threaded bolt portion 125 for receiving the end nut 55.

Figure 14:
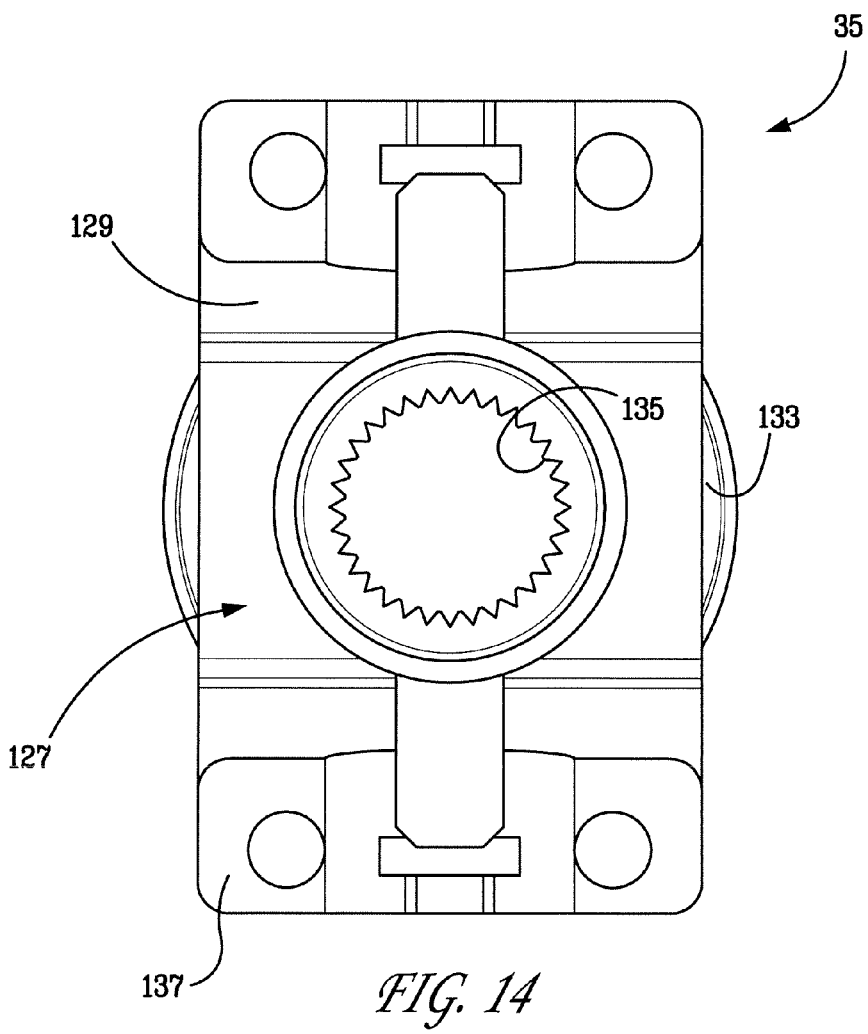
FIG. 14 is a front view of the drive shaft coupling yoke.

The drive shaft coupling yolk 35 is shown in greater detail in FIGS. 7 and 14. This coupling 35 includes a pair of U-bolts (not shown) for engaging the arms of the yolk. The coupling 35 is provided by Greg Moser Engineering, Inc. product number PY210-9. It is a 1310 series pinion yoke having U-joint with 28 internal splines 135; and it is made of forged steel. The coupling U-joint portion 127 is about 3 inches deep with arms 129 about 2⅛ inches apart. A stub cylinder 131 extends from the opposite end of the coupling 35 from the U-joint 127. This cylinder 131 is machined to be about ⅞ inch long, with an outside diameter of about 1⅞ inches. A dust shield 133 for the front grease seal 69 is peened into place on the cylinder 131 at a location where the U-joint 127 and the cylinder 131 meet.

The internal 28 spline section 135 extends thorough the coupling 35 from the base of the U-joint portion 127 to about ¹¹⁄₁₆ inch from the outside end of the cylinder 131.

The two arms 129 of the U-joint portion 127 of the coupling are bifurcated into two pads 137 both of which are drilled to receive an end of a U-bolt. Each U-bolt is forged to be about 1⅞ inches long, and to receive and hold a transverse bar of about 1 inch in outside diameter, with the ends of each U-bolt being threaded for ⁵⁄₁₆ inch lock nuts (not shown).

Many changes can be made in the above-described invention without departing from the intent and scope thereof. It is therefore intended that the above description be read in the illustrative sense and not in the limiting sense. Substitutions and changes can be made while still being within the scope and intent of the invention and of the appended claims.

The invention claimed is:

1. An adaptor for connecting a drive shaft from a front mounted vehicle transmission to the vehicle rear differential, comprising:
   a housing having a front-outer and rear-inner faces, and having a rear toroidal-shaped flange having a perimeter O-ring seal, said rear extending from said rear face of the housing for mating with the transmission opening in said rear differential, and a series of threaded holes on the rear face for receiving mounting bolts from fixing points on said rear differential;
   a front boss extending outward from the outer face of said housing;

a bore extending through said housing and said front boss and said rear toroidal-shaped flange;

a shaft extending through said bore to extend beyond said housing front boss and said rear toroidal flange, said shaft having a rear-inner spline section suitable to engage a gear in said rear differential, and a front-outer spline section;

an inner and an outer thrust bearings mounted in said housing facing each other, said bearings supporting said shaft;

a coupling yoke mounted on said shaft front spline section; and a first passageway for grease to be pumped into said housing bore to lubricate said inner and outer thrust bearings;

wherein there is a space between the wall of the bore and the shaft to provide a reservoir area for the grease pumped into said housing.

2. The adaptor of claim 1, also including a first internal annular shoulder in said bore having an inner bore face, wherein said inner and outer thrust bearings each include a bearing race insert, wherein said inner and outer bearing race inserts each seat against said first internal annular shoulder, back-to-back, on opposite sides of said shoulder.

3. The adaptor of claim 2, wherein said outer thrust bearing and outer bearing race are smaller than said inner thrust bearing and inner bearing race front bearing.

4. The adaptor of claim 3, also including a second internal annular shoulder having an inner bore face, in said bore, wherein said outer bearing race is surrounded by the inner bore face of said second internal annular shoulder.

5. The adaptor of claim 4, wherein said housing first grease passageway extends from a sidewall of said housing to the inner bore face of said first internal annular shoulder.

6. The adaptor of claim 5, also including a housing second grease passageway extending from the top wall of said housing to the inner bore face of said first internal annular shoulder.

7. The adaptor of claim 6, wherein said first grease passageway has a Zerk-type fitting on the outer end thereof at said housing sidewall.

8. The adaptor of claim 7, wherein said housing second grease passageway has a plug fitting on the outer end thereof at said housing top wall.

9. The adaptor of claim 8, wherein said housing second grease passageway plug has a pressure-indicating, air-release, spring biased pin.

10. The adaptor of claim 8, wherein said shaft has a circular flange extending about the circumference of said shaft, said flange having a flat face on the front-outer side thereof and filleted face on the rear-inner side thereof.

11. The adaptor of claim 10, wherein said shaft has a machined surface positioned between the front-outer spline section and the flat face of said circular flange.

12. The adaptor of claim 11, also including a front-outer grease seal on said bore opening at said front boss and a rear-inner grease seal on said bore opening at said toroidal flange, said rear grease seal having double flexible rubber lips fitting over said circular flange perimeter.

13. The adaptor of claim 12, also including a bracket mounted to the front-outer face of said housing, said bracket having a pair of ears each engagable with a vehicle body mount.

14. The adaptor of claim 13, wherein said coupling yoke includes a stub cylinder facing into said front boss, wherein said inner and outer bearing are seated on said shaft machined surface with said inner bearing abutting said shaft circular flange flat face and said outer bearing abutting said coupling yoke stub cylinder.

15. The adaptor of claim 14, wherein said shaft includes a threaded section outboard of said front-outer spline section, said adaptor also including a nut on said shaft threaded section.

16. The adaptor of claim 15, wherein said coupling yoke includes a U-joint with bifurcated arm, said U-joint being opposite said stub cylinder.

17. The adaptor of claim 16, wherein said housing has a hexagonally-shaped profile with a smaller lower ear extending outward from one side and a larger lower ear extending outward from the other side, wherein each ear has a drilled hole aligned for a mounting bolt point on said differential.

18. The adaptor of claim 17, wherein said bracket includes mounting holes for mounting it to said housing front-outer face above or below said front boss.

19. The adaptor of claim 4, wherein said shaft has a circular flange extending about the circumference of said shaft, said flange having a flat face on the front-outer side thereof and filleted face on the rear-inner side thereof, wherein said housing has a hexagonally-shaped profile with a smaller lower ear extending outward from one side and a larger lower ear extending outward from the other side, and wherein each ear has a drilled hole aligned for a mounting bolt point on said differential.

20. The adaptor of claim 19, also including a bracket mounted to the front-outer face of said housing, said bracket having a pair of ears each engagable with a vehicle body mount.

* * * * *